United States Patent
Diaz et al.

(10) Patent No.: US 11,126,636 B2
(45) Date of Patent: Sep. 21, 2021

(54) APPARATUS AND METHODS FOR SECURE DATA LOGGING

(71) Applicant: Fisher-Rosemount Systems, Inc., Round Rock, TX (US)

(72) Inventors: Sergio Diaz, Pflugerville, TX (US); Gary K. Law, Georgetown, TX (US); Godfrey Sherriff, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 20 days.

(21) Appl. No.: 16/684,108

(22) Filed: Nov. 14, 2019

(65) Prior Publication Data
US 2021/0149909 A1 May 20, 2021

(51) Int. Cl.
*G06F 17/00* (2019.01)
*G06F 16/25* (2019.01)

(52) U.S. Cl.
CPC ................. *G06F 16/254* (2019.01)

(58) Field of Classification Search
CPC ........ G06F 16/13; G06F 16/24; G06F 16/156; G06F 16/254; G06N 3/00; G06N 5/00; G05B 13/00
See application file for complete search history.

(56) References Cited

U.S. PATENT DOCUMENTS

| | | | |
|---|---|---|---|
| 10,140,834 B2* | 11/2018 | Barcala | G06Q 10/0833 |
| 2007/0191993 A1* | 8/2007 | Wyatt | G06F 11/3034 |
| | | | 700/299 |
| 2016/0042638 A1* | 2/2016 | Sangha | G08B 29/26 |
| | | | 340/628 |
| 2017/0065232 A1* | 3/2017 | Lane | A61B 5/002 |
| 2017/0364273 A1* | 12/2017 | Schreter | G06F 3/0619 |
| 2017/0364417 A1* | 12/2017 | Schreter | G06F 16/23 |
| 2018/0217234 A1* | 8/2018 | Skowronek | G01S 17/89 |
| 2018/0217235 A1* | 8/2018 | Skowronek | G01S 17/89 |
| 2019/0018106 A1* | 1/2019 | Skowronek | G01S 7/4815 |
| 2020/0386668 A1* | 12/2020 | Olson | F24F 11/32 |

* cited by examiner

*Primary Examiner* — Hung D Le
(74) *Attorney, Agent, or Firm* — Hanley, Flight & Zimmerman, LLC

(57) ABSTRACT

Apparatus and methods for secure data logging are disclosed. An example method for secure data transfer from a process control system network includes storing information received by a process controller via the process control system network, the process controller including a safety instrumented system controller or a process control system controller, the information transferred uni-directionally from the process control system network to a data logger via a data diode, identifying a trigger event on the process control system network, in response to identifying the trigger event, parsing the stored information for event data, and transferring the event data from the data logger to a data extractor.

20 Claims, 5 Drawing Sheets

APPARATUS AND METHODS FOR SECURE DATA LOGGING

FIELD OF THE DISCLOSURE

This disclosure relates generally to process control systems and, more particularly, to apparatus and methods for secure data logging.

BACKGROUND

Process control systems are designed to maintain a specific process within a desired range and typically include instrumentation positioned throughout a plant to enable collection of data for purposes of monitoring and troubleshooting. Data collection involves measurements made by sensors, including parameters such as pressure, flow rate, temperature, weight, density, velocity, etc. A Basic Process Control System (BPCS) receives inputs from sensors and process instrumentation, allowing the BPCS to function as a first layer of protection against unsafe conditions. A Safety Instrumented System (SIS) is implemented in addition to the BPCS to protect personnel, equipment, and the environment by reducing the likelihood or the severity of an emergency event through dedicated monitoring of safety-related process control system instrumentation.

SUMMARY

An example method for secure data transfer from a process control system network includes storing information received by a process controller via the process control system network, the process controller including a safety instrumented system controller or a process control system controller, the information transferred uni-directionally from the process control system network to a data logger via a data diode, identifying a trigger event on the process control system network, in response to identifying the trigger event, parsing the stored information for event data, and transferring the event data from the data logger to a data extractor.

An example apparatus for secure data transfer from a process control system network includes a a data storage to store information received by a process controller via the process control system network, the process controller including a safety instrumented system controller or a process control system controller, the information transferred uni-directionally from the process control system network to a data logger via a data diode, an event detector to identify a trigger event on the process control system network, a data parser to parse the stored information for event data in response to identifying the trigger event, and a connector to transfer the event data from the data logger to a data extractor.

An example non-transitory computer readable storage medium includes instructions that, when executed, cause a machine to at least store information received by a process controller via a process control system network, the process controller including a safety instrumented system controller or a process control system controller, the information transferred uni-directionally from the process control system network to a data logger via a data diode, identify a trigger event on a process control system network, parse the stored information for event data in response to identifying the trigger event, and transfer the event data from the data logger to a data extractor.

DETAILED DESCRIPTION

Figure 1:
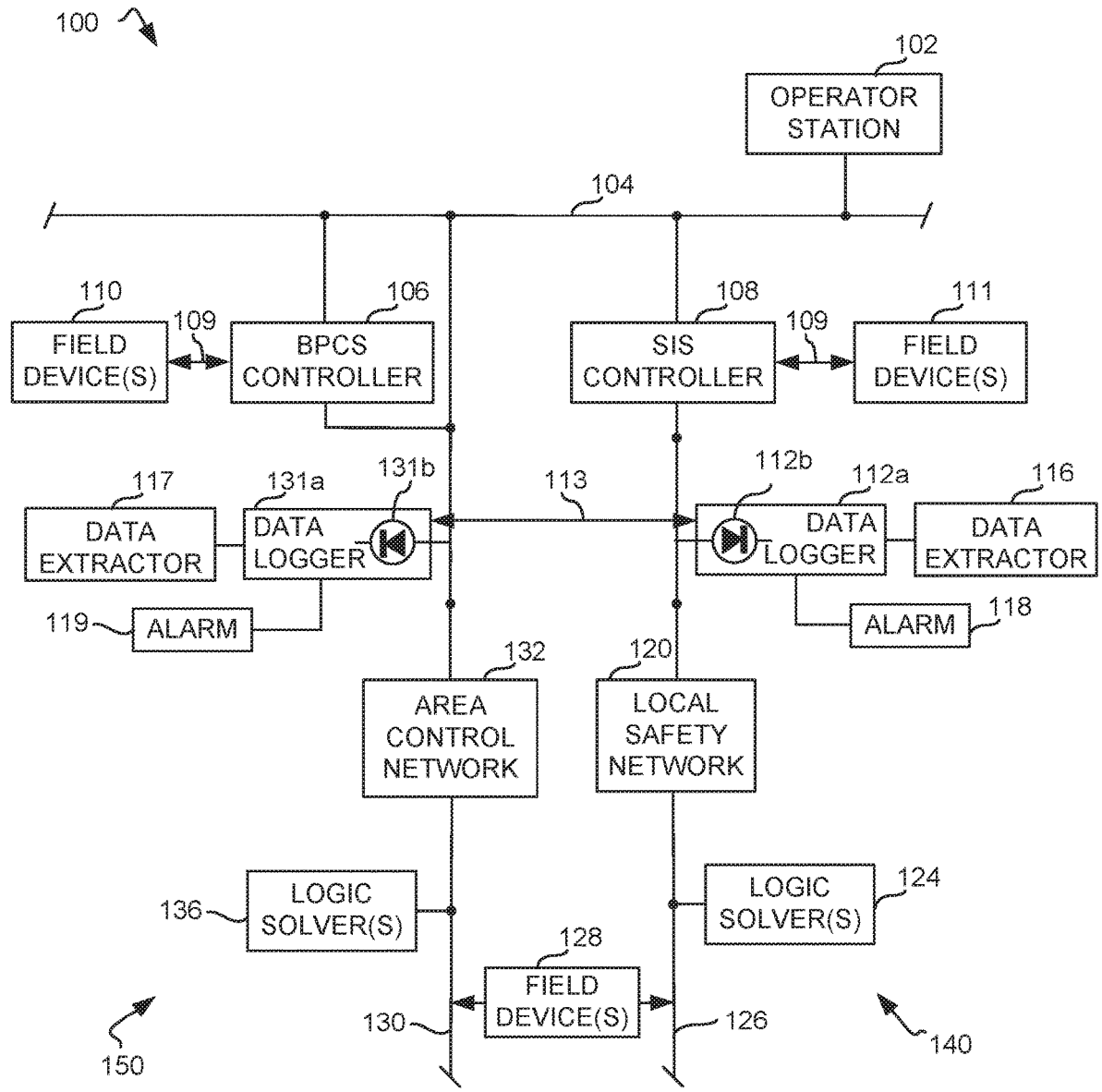
FIG. 1 is a block diagram of an example process control system that can be configured to use the example secure data logger apparatus and methods described herein for purposes of data extraction via an internal network.

Process control systems implementing critical processes (e.g., chemical processing plants, power plants, etc.) can present significant safety risks if not properly controlled. A Basic Process Control System (BPCS) provides a first layer of protection by allowing for continuous control of the overall process using BPCS-associated controllers, logic solvers, and field devices. A BPCS is commonly implemented using pneumatic control loops, programmable logic controllers, distributed control systems (DCSs), discrete control systems, and single loop controllers. DCSs are used to supervise complex production processes (e.g., large refineries) and include sensors, controllers, and associated computers distributed throughout a plant for purposes of data acquisition, process control, as well as storage and graphical display. Additional safety measures can be introduced through automated shutdown sequences combined with operator intervention to shutdown a process using the predetermined sequences.

A Safety Instrumented System (SIS) monitors special-purpose field devices and other special-purpose control elements associated with the SIS that are physically and logically separate from the BPCS. The SIS is responsible for the safe shutdown of a process in response to control conditions that present a significant safety risk. The SIS relies on dedicated logic solvers, controllers, safety certified field devices (e.g., sensors, final control elements, shut-off valves, etc.), data redundancy devices and routines, and safety certified software code. For example, field sensors (e.g., pneumatic sensors, electrical switches, smart transmitters with on-board diagnostics, etc.) are used to collect information (e.g., temperature, pressure, flow rate, etc.) to identify an emergency situation. Logic solvers provide fail-safe and fault-tolerant operation to determine actions to be taken based on the collected information, while final control elements (e.g., pneumatically-actuated on-off valves operated by solenoid valves) implement actions determined by the logic system. For example, SIS controllers can test the safety overrides of process control valves by temporarily interrupting a solenoid valve power supply signal.

An unplanned but safe process shutdown can occur as a result of a spurious trip event associated with an SIS, contributing to high operational costs. A post-mortem analysis is used to evaluate process conditions before and after the trip to determine the potential root cause of the event. Data logging capabilities enable collection of data related to the pre- and post-trip event analysis. However, such data logging capabilities must be secure to prevent unauthorized access to the process control system network. Current data retrieval methods include connecting a computer to the control system safety network and running a data logging software application on that computer or remotely connecting to the network to retrieve the data. Data loggers allowing physical or remote computer connections increase security risks, because cyber-attack vectors (e.g., malware injections) can be introduced to the SIS (e.g., to cyber-attack logic solvers or system controllers). Cybersecurity threats can significantly impact the availability and integrity of an SIS, which remains vulnerable to cyber incidents, as do other industrial control systems including distributed control systems (DCSs). Given that SIS controllers protect critical assets (e.g., refineries, power plants, chemical plants, offshore oil rigs, etc.) from potentially catastrophic malfunctions, a successful cyber-attack on such a system removes a well-engineered safety measure relied on by operators to prevent adverse events. Likewise, provoking an unintended SIS shut-down via a cyber-attack can take production offline with operational and financial impacts. A global functional safety standard set by the International Electrotechnical Commission (e.g., IEC 61511), which deals with practices in the engineering of systems that ensure the safety of an industrial process, necessitates that SIS designs provide resilience against identified security risks. However, common preventative measures such as anti-virus software may not be effective when new cyber-attacks are implemented and signatures to identify such attacks are not yet developed and deployed to detect unusual events.

Examples disclosed herein eliminate the potential of a data logger to be used for the introduction of cyber-attack vectors to a process control system. In the examples disclosed herein, a hardware data diode can be embedded into a data logger appliance to eliminate the risk of a successful cyber-attack on a process control system via the data logger. In examples disclosed herein, the data logger can listen to traffic on the process control safety network but cannot send information to the safety network. Furthermore, the examples disclosed herein can capture and store metadata, logged data, and time information required for post-trip event analysis, which can further be used to interpret, search, and report on the data. For example, recorded data relating to pre- and post-trip information can be retrieved without compromising the safety of the process control system, and the action to save data logs can be triggered by select conditions configured by the user. Incorporation of the hardware data diode into the data logger as described herein does not require any modifications to the SIS architecture to enable the data logging. Furthermore, the data logging activities presented herein can be used to collect and correlate data from various layers of a process control system (e.g., SIS, BPCS), as well as in distributed control systems (DCSs). Such data is not limited to safety-related event data, but can include any data collection relevant to a trigger event. Furthermore, the use of a hardware data diode-based data logger is not restricted to a single process control system, and may be implemented in any industrial control system that requires increased cyber-security protection. In the examples disclosed herein, the data logger can be used to detect unusual traffic patterns within a network (e.g., safety network, area control network) to initiate an alert when significant changes in the traffic pattern are detected.

FIG. 1 is a block diagram of an example process control system 100 that can be configured to use the example secure data logger apparatus and methods described herein for purposes of data extraction via an internal network. The example process control system 100 includes an example operator station 102. The operator station 102 is communicatively coupled via a bus or an example local area network (LAN) 104 to process control system controllers, which include an example Basic Process Control System (BPCS) controller 106 and an example Safety Instrumented System (SIS) controller 108. In some examples, the LAN 104 is an Area Control Network (ACN) that may be implemented using any desired communication medium and protocol. For example, the LAN 104 may be based on a hardware or wireless Ethernet communication protocol. However, any other suitable wired or wireless communication medium and protocol could be used instead.

The operator station 102 may be configured to perform operations associated with one or more information technology applications, user-interactive applications, and/or communication applications. For example, the operator station 102 may be configured to perform operations associated with process control-related applications and communication applications that enable the station 102 and the controller(s) 106 and/or 108 to communicate with other devices or systems using any desired communication media (e.g., wireless, hardwired, etc.) and protocols (e.g., HTTP, SOAP, etc.).

The example controller(s) 106 and/or 108 (e.g., BPCS controller 106 and SIS controller 108) may be configured to perform one or more process control routines and/or functions operating as one or more control loops that have been generated by a system engineer or other system operator using, for example, the operator station 102 or any other workstation and which have been downloaded to and instantiated in the controller(s) 106 and/or 108. The controller(s) 106 and/or 108 can be coupled to a plurality of field device(s) 110 and 111, respectively, via a digital data bus and an input/output (I/O) device. In some examples, the field device(s) 110 and 111 can be coupled to the controller(s) 106 and/or 108 via example hardwired link(s) 109. The field device(s) 110 and 111 can include Fieldbus compliant valves, actuators, sensors, etc., in which case the field device(s) 110 and 111 communicate via a digital data bus using a Fieldbus protocol. In some examples, other types of field devices and communication protocols can be used. For example, the field device(s) 110 and 111 can be Profibus, HART, or AS-i compliant devices that communicate via a data bus using Profibus, AS-i, and HART communication protocols.

Known installations in process industries have field devices (e.g., sensors, valves, etc.) that are shared by a BPCS and an SIS. For example, sensor data can be shared between the BPCS and SIS by using a signal splitter and wiring the same sensor to both systems. In other examples, integrated control and safety systems allow a logic solver to directly share the input signal data with one or more process controllers. In some examples, the field devices are specific to a process controller (e.g., the field device(s) 110 are communicatively coupled to the BPCS controller 106 while the field device(s) 111 are communicatively coupled to the SIS controller 108). The BPCS controller 106 and the SIS controller 108 receive signals indicative of process measurements made by the field device(s) 110 and 111, respectively, and/or other information pertaining to the field device(s) 110 and 111, and use this information to implement control routines and generate control signals that are sent over the buses and/or other communication paths to the field devices 110 and 111 to control the operation of the process. Information from the field device(s) 110 and 111 and the controller(s) 106 and 108 may be made available to one or more applications executed by the operator station 102 to enable an operator to perform desired functions with respect to the process, such as viewing the current state of the process, modifying the operation of the process, etc. For example, the SIS controller 108 can read signals from the field device(s) 111 (e.g., field devices in direct communication with the SIS) and/or field device(s) 128 (e.g., field devices in communication with both the BPCS and the SIS) and execute pre-programmed actions to prevent a hazard by providing output(s) to final control elements.

In FIG. 1, an example SIS 140 includes the SIS controller 108, the SIS-dedicated field device(s) 111, an example data logger 112a, an example local safety network 120, example logic solver(s) 124, and the field device(s) 128. An example BPCS 150 includes the BPCS controller 106, the BPCS-dedicated field device(s) 110, an example data logger 131a, an example area control network 132, example logic solver(s) 136, and the field device(s) 128. The local safety network 120 can be a standard Ethernet network dedicated to the process safety system that enables communication between the SIS controller 108 and the logic solver(s) 124. Similarly, the area control network 132 can be a standard Ethernet network dedicated to the process control system that enables communication between the BPCS controller 106 and the logic solver(s) 136. The logic solver(s) 124 and 136 can include smart logic solvers that communicate secure parameters and input data to other logic solvers over the local safety network 120 and/or the area control network 132, respectively. In some examples, the SIS controller 108 can connect to the area control network 132 in addition to the local safety network 120, such that the SIS-dedicated logic solver(s) 124 are isolated from the process control system. For example, the local safety network 120 can remain dedicated to safety-related purposes as opposed to being used for both control and safety, thereby enabling SIS components to be immune to any failure of the area control network 132. The SIS components can be communicatively coupled via a bus 126 and/or the local safety network 120, and the BPCS components can be communicatively coupled via a bus 130 and/or the area control network 132. The local safety network 120 and the local area control network 132 can include network switches used to control the flow of data through the safety network 120 and area control network 132.

The data logger 112a of the SIS 140 is communicatively coupled to the local safety network 120 to capture and store all input information and specific data needed to perform a trip analysis. In some examples, this information can be stored continuously in a data storage component (e.g., hard disk) and overwritten after a period of time (e.g., a period of time configured by a user) if no trigger event is detected in the SIS 140. In some examples, the data logger 112a records all data before and after a trigger event is detected based on user-configurable settings, as detailed below in connection with FIGS. 3-4. Such data can include time stamp information for each collected data point provided by the SIS 140. In some examples, the data capture activity of the data logger 112a can include recording the integrity or status of each data point captured for use during the trip event analysis (e.g., quality control data), or any other type of analysis to be performed using data captured by the data logger 112a (e.g., data configured by a user to be captured by the data logger 112a). For example, a thorough assessment of the data can require that data integrity is not compromised (e.g., level of accuracy, completeness, and consistency of the data is taken into consideration during the analysis). While user configuration of the data logger 112a can be performed (e.g., to define parameters to be collected, such as by exporting information from the SIS 140 to configure collection points within the data logger 112a), no modifications to the SIS 140 are required to enable data logging using the data logger 112a. For example, unlike known data logging applications, installation of software or enabling of certain services on the SIS engineering station (e.g., operator station 102) is not necessary to allow the data logger 112a to perform information retrieval from the SIS 140, because the data logger 112a is capable of discovering a process control network and can automatically identify SIS-dedicated devices on the process control system network. While the data logger 112a is an SIS-dedicated data logger, the example data logger 131a is a BPCS-dedicated data logger that can be used to communicatively couple to the area control network 132 to capture and store all input information and BPCS-specific data that can be retrieved as necessary for off-network assessments.

The data loggers 112a and 131a include respective integrated hardware data diodes 112b and 131b to prevent using the data loggers 112a and/or 131a as an attack vector (e.g., for purposes of a cybersecurity attack on the process control system 100 via malware injection). In the example of FIG. 1, the data diodes 112b and 131b are shown as being within the data loggers 112a and 131a, respectively. In this example, the connection between each of the data loggers and the data diodes is a physical connection. However, in some examples, the connection between the data loggers and the data diodes can be a logical connection rather than a physical connection. The data diodes 112b and 131b provide listening-only capabilities to the data loggers 112a and 131a, such that the data loggers 112a and 131a are able to capture and store input information, transfer the information one-way (e.g., uni-directionally) to respective example data extractors 116 and/or 117, but prevent any input from the data extractors 116 and 117 to the process control system 100 (e.g., input to the SIS 140 via the data logger 112a and/or input to the BPCS 150 via the data logger 131a). In some examples, the data diodes 112b and 131b can include two nodes or circuits (e.g., one "send only" node and one "receive only" node) that permit flow of data in one direction only from a source (e.g., the local safety network 120 to the data logger 112a via the data diode 112b). In some examples, the data diodes 112b and 131b can include an optical fiber with a transmitter on one side (e.g., a port to transmit information to an external device) and a receiver on the other side (e.g., a port to receive information from the process control system) to ensure that data can only be transferred in one direction. For example, the data diodes 112b and 131b can include switch fabrics (e.g., a first switch fabric and a second switch fabric) interconnected such that a port of the first switch fabric that transmits data (e.g., data from the BPCS controller 106 and/or the SIS controller 108 and/or data from the local safety network 120 and/or the area control network 132) is connected to a port of the second switch fabric that receives data (e.g., data logger(s) 112a and/or 131a). However, no other connection between the switch fabrics is made to maintain the uni-directional flow of data. The switch fabrics can be configured such that a link status (e.g., "link up" or "link down") is ignored for these interconnected switch ports, allowing other ports of the first switch fabric to forward packets (e.g., data sent over a network) to the second switch fabric. In some examples, the switch fabric port that receives data (e.g., a port of the second switch fabric, also known as an interconnect port because it can connect two separate devices, such as the data logger 112a and the data extractor 116) can forward received packets to its other ports. In some examples, the switch fabrics are configured to forward traffic as described above regardless of internal MAC address tables that may have been learned. For example, a MAC address table contains address information that a switch can use to forward traffic between ports, such that the MAC addresses in such a table are associated with one or more ports. By disabling MAC address learning, the switch fabrics forward traffic based on a given configuration, facilitating uni-directional flow of data while allowing devices connected to other ports of the switch to be provided with good (e.g., connected) status. A data diode directed out from the network (e.g., the local safety network 120 and/or the area control network 132), as shown in connection with the example data diodes 112*b* and 131*b*, which are oriented to transfer data out of the network, allows the network to stay protected by guaranteeing that the same connection in the opposite direction cannot be used to reach the secure network and affect the process control system 100 environment. As such, a data diode can be used to segment a network, defend the network, and/or transfer information uni-directionally (e.g., from the network to the data logger and on to the data extractor). In some examples, the data diodes 112*b* and 131*b* can be embedded into the data loggers 112*a* and 131*a* to send data from the local safety network 120 and/or the area control network 132 to an external system and/or user without creating a threat vector back to the secured network.

Figure 2:
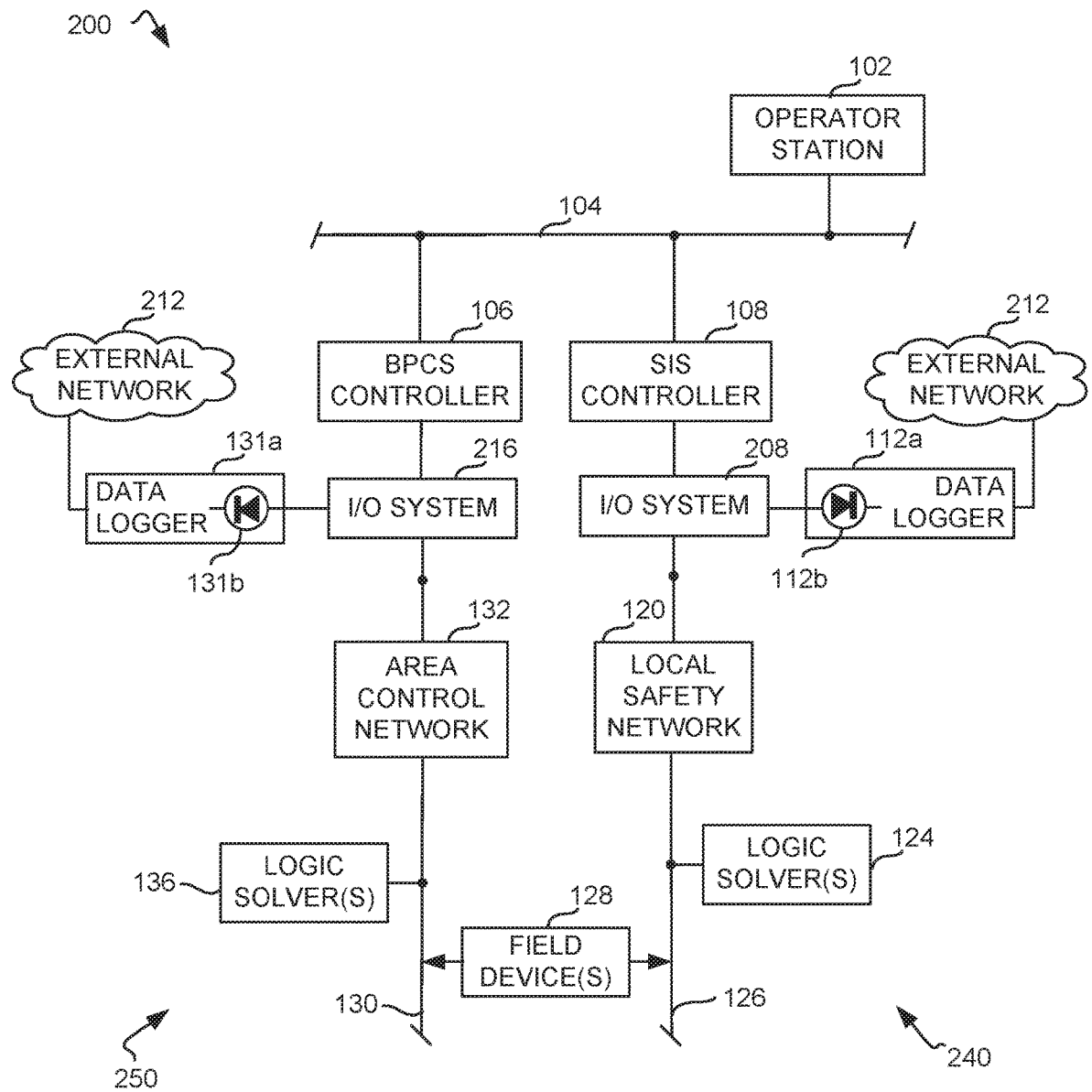
FIG. 2 is a block diagram of an example process control system that can be configured to use the example secure data logger apparatus and methods described herein for purposes of data extraction via an external network.

In the example of FIG. 1, data transfer occurs from the data loggers 112*a* and 131*a* to the data extractors 116 and 117, respectively, using a local network, while the example of FIG. 2 details the use of data loggers for data transfer via an external network. As opposed to using software that is also vulnerable to a cyberattack (e.g., such as a firewall), embedding a data diode into a data logger permits hardware-enforced data transfer that provides a level of cybersecurity that is difficult to compromise using an external attack. However, the data diode-based data logger disclosed herein is not limited to applications in safety instrumented systems or basic process control systems and, thus, can be utilized in any type of industrial process control application for enhanced security (e.g., in a distributed control system). For example, because the data diodes 112*b* and 131*b* are hardware-based, an online attack on the data diodes 112*b* and 131*b* is difficult to perform because the data diode(s) do not contain any software, logic, or field-programmable gate arrays and allow signal travel in one direction via a physical path. Likewise, any issues on a data logger network (e.g., a set of data loggers connected together) would not affect the integrity of the safety network. For example, given that the data diode (e.g., data diode(s) 112*b* and 131*b*) is positioned between the process control system network (e.g., local safety network 120 and/or area control network 132) and the data logger (e.g., data logger(s) 112*a* and/or 131*a*), the data logger does not influence the network to which it is listening given the uni-directional transfer of data from the network to the data logger via the data diode. In some examples, the data logger(s) 112*a* and/or 131*a* can be used to connect to more than one network (e.g., the data logger 112*a* can be used to connect to the local safety network 120 and the area control network 132) if proper security protections are in place. In examples where data collection is related to trip analysis, the data logging can be configured to automatically discard any data that is not necessary for the analysis to prevent the risk of using the data logger as a mechanism to decode the safety network traffic for malicious purposes. In some examples, the SIS 140 and/or the BPCS 150 can be alerted when the data logger(s) 112*a* and/or 131*a* are not operational (e.g., by sending information from the data logger 112*a* to the SIS 140). In such examples of alerting a process control system that the data logger(s) 112*a* and/or 131*a* are not functional, there is no traffic into the safety network 120. For example, the data logger 112*a* provides the information using either a physical signal (e.g., a dry contact, such as an alarm 118) or a message on a separate network other than the safety network 120 (e.g., such as a message to the operator station 102 via the area control network 132).

In some examples, the data loggers 112*a* and 131*a* can be used to detect unusual traffic patterns within one or more safety networks. For example the data loggers 112*a* and 131*a* can be used to detect an unexpected network node and trigger an alarm in response to the detection (e.g., example alarms 118, 119 connected to the data logger(s) 112*a* and/or 131*a*). For example, the data logger(s) 112*a* and/or 131*a* can generate a baseline of the traffic on the local safety network 120 and/or the area control network 132. If the data logger(s) 112*a* and/or 131*a* detect significant changes in the traffic pattern, the SIS 140 and/or the BPCS 150 can be alerted to this potential security issue using the one or more alarm(s) 118 and/or 119. In some examples, one or more data logger(s) can be used to collect data on other networks (e.g., the data logger 112*a* of the SIS 140 can be used to collect data from the area control network 132 of the BPCS 150 in addition to the local safety network 120). Data collection in both the SIS 140 and the BPCS 150, as illustrated in the example of FIG. 1 where the data logger 112*a* and the data logger 131*a* are used to collect data from both process control system networks, can be used to coordinate trigger signals so that recorded data can be correlated. For example, use of data collection from both the SIS 140 and the BPCS 150 allows the determination of whether or not an SIS demand was produced by a BPCS failure. As such, access to both sets of data via the one or more of the data logger(s) 112*a* and/or 131*a* can improve root cause analysis. In some examples, the data logger(s) 112*a* and/or 131*a* can include multiple ports, with the data logger(s) 112*a* and/or 131*a* having one or more data diode(s) (e.g., a data diode per port). For example, the data logger(s) 112*a* and/or 131*a* can communicate via a link 113, which permits the data loggers 112*a* and/or 131*a* to exchange information regarding the SIS 140 and/or the BPCS 150. When information is exchanged between data loggers 112*a* and 131*a*, the SIS 140 remains isolated from the BPCS 150 due to the positioning of the data diode 112*b* such that the data logger receives information from the safety network 120 but does not send information back to the network 120. This provides additional protection to the process control system network in the event that the data logger(s) 112*a* and/or 131*a* become corrupted. In some examples, the use of data loggers requires changing a switch configuration (e.g., to set one port to promiscuous mode) to allow all network traffic to be sent to the port. In some examples, the data loggers 112*a* and 131*a* can be deployed as in-line devices to prevent the need for changing the port configuration at a network switch (e.g., a network switch for the local safety network 120 and/or the area control network 132). In some examples, the data logger(s) 112*a* and/or 131*a* can include two ports (e.g., two ports for the SIS 140 and/or two ports for the BPCS 150 and/or one port each for the SIS 140 and the BPCS 150). This ensures that no changes are required for the control system network switch. For example, as illustrated in FIG. 1, the data logger 112*a* is connected between the local safety network 120, which can include a network switch, and a network node to monitor (e.g., the SIS controller 108). In some examples, the network node to monitor can be, for example, the logic solver(s) 124 of the SIS. Furthermore, as illustrated in FIG. 1, the data logger 131a is connected between the control system network switch (e.g., a network switch of the area control network 132) and a network node to monitor (e.g., the BPCS controller 106). In some examples, the data logger(s) 112a and/or 131a can have additional ports for networking with other data loggers (e.g., allowing the SIS-dedicated data logger 112a to network with the BPCS-dedicated data logger 131a), as well as additional dry contacts for alarming purposes (e.g., using alarm(s) 118 and/or 119). In some examples, one of the ports for the data logger(s) 112a and/or 131a can be disabled for the BPCS 150 connection or the SIS 140 connection and instead connected to a free port on the SIS 140 network (e.g., using a network switch of the local safety network 120) or the BPCS 150 network (e.g., using a network switch of the area control network 132).

The data extractors 116 and/or 117 retrieve data stored in the data logger(s) 112a and/or 131a. For example, the data extractors 116 and/or 117 can be implemented using a computing device (e.g., laptop or other mobile computer) that can connect to the data logger(s) 112a and/or 131a via Bluetooth. Such a connection requires physical access to the data logger(s) 112a and/or 131a (e.g. access to the internal network), which represents lower security risks as compared to extracting data using a remote network connection (e.g., as described in connection with FIG. 2). The data extractor(s) 116 and/or 117 can also be a USB drive physically inserted into the data logger(s) 112a and/or 131a. In some examples, a single computer can be used as the data extractor 116 or 117 to extract data from multiple data logger(s) 112a and/or 131a connected via a separate and/or isolated network.

The logic solver(s) 124 are implemented using the SIS controller 108, which is configured to implement one or more safety instrumented functions. For example, a safety instrumented function can include monitoring one or more process conditions associated with one or more specific hazards and/or unsafe conditions, and evaluating the process conditions to determine if a shutdown of the process is warranted. If a shutdown of the process is warranted, one or more field devices, components, and/or elements (e.g., shut down valves) are engaged to effect or perform the shutdown. In some examples, each safety instrumented function can be implemented using at least one sensing device, one logic solver, and one field device. The logic solver(s) 124 can be configured to monitor at least one process control parameter via one or more sensors and operate the field devices (e.g., field device(s) 128) to effect a safe shutdown of the process if hazardous conditions are detected. For example, the logic solver(s) 124 can be communicatively coupled (e.g., via the bus 126) to the field device(s) 128 (e.g., a pressure sensor that senses the pressure in a vessel or tank) that can be configured to assist in shutdown procedures (e.g., cause a vent valve to open if an unsafe overpressure condition is detected via a pressure sensor). The logic solver(s) 124 can be configured to implement one or more safety instrumented functions and can be communicatively coupled to multiple safety-rated or certified field devices. As shown in FIG. 1, the logic solver(s) 124 are communicatively coupled to the SIS controller 108 via the example bus 126 and/or the local safety network 120. However, the logic solver(s) 124 could alternatively be communicatively coupled within the system 100 in any other desired manner. Regardless of the manner in which the logic solver(s) 124 are coupled to the system 100, the logic solver(s) 124 are preferably, but not necessarily, logical peers with respect to the SIS controller 108.

Unlike the logic solver(s) 124, the logic solver(s) 136 are separate from the SIS 140 and do not have access to the SIS local safety network 120, which is also not accessible by other components of the BPCS 150. In some examples, the BPCS controller 106 can receive information from the logic solver(s) 124 by a different bus to allow SIS information to be viewed by plant operators. In some examples, such information can be obtained by using the data diode-based data logger (e.g., data logger 131a) where an extra port is used to connect to the local safety network (e.g., via the local safety network 120 switch), as described above. In some examples, the extra port on the data logger 131a can be used to connect to another data logger (e.g., data logger 112a) to retrieve the SIS-related information.

The field device(s) 110, 111, and 128 can be smart or non-smart field devices including sensors, actuators, and/or other process control devices that can be used to monitor process conditions and/or effect a controlled shut down of the process control system 100. For example, the field devices 110, 111, and 128 can be safety certified or rated flow sensors, temperature sensors, pressure sensors, shut down valves, venting valves, isolating valves, critical on/off valves, etc. Any number of field devices and/or logic solvers can be implemented in the process control system for any number of desired process control or safety instrumented functions. In the case where, for example, the field device(s) 128 are smart devices, the logic solver(s) 124 can communicate with the filed device(s) 128 using a hardwired digital communication protocol (e.g., HART, Fieldbus, etc.). However, any other type of communication media (e.g., hardwired, wireless, etc.) and protocol may be used instead.

FIG. 2 is a block diagram of an example process control system 200 that can be configured to use the example secure data logger apparatus and methods described herein for purposes of data extraction via an external network. Because some elements of the illustrated example of FIG. 2 are identical to those discussed above in connection with FIG. 1, the description of identical elements is not repeated here. Instead, identical elements are illustrated with identical reference numerals in FIG. 2, which provides a complete description of those like-numbered elements. In contrast to the illustrated example of FIG. 1, in the example process control system 200 of FIG. 2 the example data loggers 112a and 131a have the additional capability of being able to transfer data to a data extractor via an external network (e.g., an external network 212). For example, the data loggers 112a and 131a of FIG. 2 can provide edge gateway capabilities (e.g., accessing of an external network beyond the process control networks, including the local safety network 120 and the area control network 132). For example, the data loggers 112a and 131a can be used to preprocess data locally at the edge before sending it on to the cloud (e.g., the external network 212), providing a gateway between networks by controlling data flow at the boundaries between the networks. As such, instead of using separate edge gateway and data logging devices, the data logger(s) 112a and/or 131a use the collected data to allow its transfer to an end user via the external network 212. For example, the data logger(s) 112a and/or 131a can route information from the control system (e.g., an SIS 240 and/or a BPCS 250) that is not in use by the control system (e.g., the BPCS controller 108 and/or SIS controller 108) to make it available to an external application in a secure manner.

In some examples, the data logger(s) 112a and/or 131a can be connected to input/output (I/O) system(s) 208 and/or 216 of the one or more SIS 240 and/or BPCS 250, as illustrated in the example of FIG. 2. The I/O system(s) 208 and/or 216 receive data from the field device(s) 128 and convert the data into communications capable of being processed by the example controller(s) 106 and/or 108. Likewise, the I/O system(s) 208 and/or 216 can convert data or communications from the controller(s) 106 and/or 108 into a data format capable of being processed by the corresponding field device(s) 128. In some examples, the I/O subsystem is a main control system I/O subsystem that receives information from field devices deployed in the process control system (e.g., field device(s) 128). In such examples, the data loggers 112a and 131a can listen to data available from the area control network 132 and/or the local safety network 120 via the I/O system and transmit the data via an external network. In such examples, the data logger(s) 112a and/or 131a do not require access to each individual process control system network. Communication from the data logger(s) 112a and/or 131a to the external network 212 can occur via, for example, an Ethernet connection, a coaxial cable system, a satellite system, a line-of-site wireless system, etc.

Figure 3:
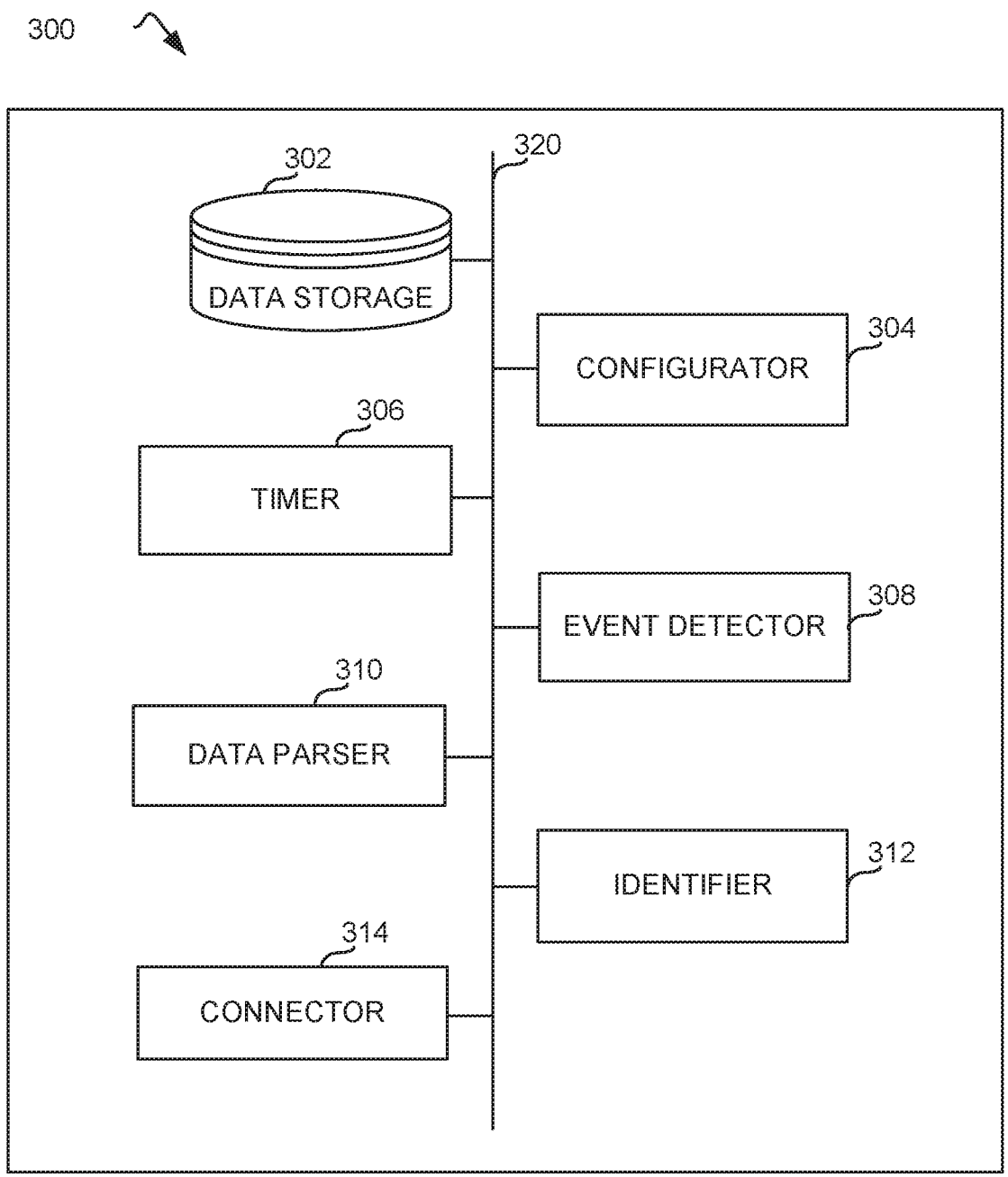
FIG. 3 is a block diagram illustrating an example data logger to log data in a process control system network in accordance with the teachings of this disclosure.

FIG. 3 is a block diagram illustrating an example data logger to log data in process control system network 100 and/or 200 in accordance with the teachings of this disclosure. The example data logger 300 may be used to implement the data loggers 112a and 131a and includes example data storage 302, an example configurator 304, an example timer 306, an example event detector 308, an example data parser 310, an example identifier 312, and an example connector 314.

The data storage 302 stores information received by the process controller (e.g., basic process control system (BPCS) controller 106 and/or the safety instrumented system (SIS) controller 108). Process control system information stored by the data storage 302 can include any information captured by the data logger 300 that is received by the controller(s) 106 and/or 108. In some examples, the input information can be stored continuously in the data storage 302 (e.g., hard disk). The data storage 302 can include data relevant to the controllers 106 and/or 108 activity occurring over a period of time, such as data captured from the field device(s) 110, 111, and/or 128 (e.g., sensors, final control elements, shut-off valves, etc.). In some examples, the data stored in the data storage 302 can be overwritten after a period of time specified via user-based configuration. Data captured by the data logger(s) 112a and/or 131a and stored in the data storage 302 can include information relevant for performing a trip analysis (e.g., resulting from a trip event associated with an unplanned but safe process control system shutdown). Such information can include time stamping for each collected data point provided by the controllers 106 and/or 108, where the data points correspond to information (e.g., temperature, pressure, flow rate, weight, stress, etc.) relevant to the status of the process control system (e.g., the SIS 240 and/or the BPCS 250). In some examples, the data storage 302 stores metadata, logged data, and time information as it is broadcast, to allow the data logger 300 to be used for applications developed to interpret, search, and report on the data. In some examples, the data storage 302 beings to record data as soon as the data logger 300 is connected to a process control system network. For example, the data logger 300 engages in self-discovery of a process control system, to enable automatic detection of devices on the process control system network.

The configurator 304 can be used to configure the data logger 300. For example, the configurator 304 can be used to set the period of time (e.g., via a timer 306) over which collected data is stored in the data storage 302 before being overwritten. The timer 306 can be used to determine when a time interval has elapsed (e.g., user-configured data collection time interval) such that the data logger 300 overwrites the existing stored information in the data storage 302. In some examples, the data logger 300 can be configured, using the configurator 304, to store safety-related event data, such as logged data, metadata, and time stamp information. In some examples, the configurator 304 can be used to configure the data storage 302 based on the type of data assessment to be performed using the collected process control system-based information. In some examples, the configurator 304 is used to configure the storage and recording of pre- and post-trip data for purposes of analyzing safety-related event information, with the action to save certain logs using the data storage 302 based on process control system parameters of interest for a safety-related event assessment. For example, certain data logs can help determine the integrity level of the protective system, such as the reliability of process control system components, which can be established through testing.

The event detector 308 identifies an event of interest (e.g., a trigger event) of the process control system 100 and/or 200 network. For example, the trigger event can be a safety-related event that occurs on the SIS 240 and/or the BPCS 250 network. A safety-related event includes appearance of an unexpected node on the one or more process control network(s) or a change in a traffic pattern of the one or more process control network(s), the change corresponding to a deviation from a traffic pattern designated as normal. In some examples, the event can be any event of interest that might occur on an industrial system network (e.g., change in a specific process control system parameters).

The data parser 310 parses the information stored in the data storage 302 for trigger-event related data. For example, in the presence of a safety-related event, the data parser 310 retrieves data before and after the safety-related event. Such data can include logged data, metadata, and time stamp information. This allows for a thorough assessment of the process control system activity and can include the assessment of data from one or more process control system networks (e.g., the local safety network 120 and/or the area control network 132 of FIGS. 1-2). In some examples, if the data parser 310 is not able to identify any incoming data (e.g., inputs) from the process controller (e.g., processor controller(s) 106 and/or 108) to the data storage 302, the data parser 310 triggers an alarm outside of the process control system network (e.g., alarm 118 of FIGS. 1-2), the alarm used when input information to the process controller is not accessible.

Once the data parser 310 has retrieved data from the data storage 302 that corresponds to data before and/or after a trigger event, the identifier 312 identifies specific data content from the retrieved data that is necessary for a given assessment (e.g., root cause analysis). For example, the identifier 312 can retrieve signal value information, data integrity information, and time stamp information captured by the process controller(s) 106 and/or 108.

The connector 314 transfers event data to a data extractor (e.g., the data extractor 116). Given that a data diode (e.g., data diode 112b) can, in some examples, be embedded in the data logger (e.g., data logger 112a) to transfer data unidirectionally from the process control system network (e.g., local safety network 120) to the data logger (e.g., data logger 112a), the data extractor can receive information from the data logger 300 but the data logger 300 does not allow transfer of information into the process control system network (e.g., local safety network 120). The data logger 300 can have multiple connectors (e.g., ports) that allow for the transfer of information (e.g., via an internal network or an external network). In some examples, the connector 314 can be used to connect one data logger to another data logger (e.g., a data logger storing data from a different process controller), to receive information about a separate process control system (e.g., aggregate data for both the SIS 240 and the BPCS 250). In some examples, the connector 314 is used to transfer data to a data extractor (e.g., USB drive, laptop, etc.) or an external network (e.g., the external network 212) from the area control network 132 and/or the local safety network 120 via an I/O system (e.g., I/O system(s) 208 and/or 216) without requiring access to each individual process control system network. In some examples, the connector 314 connects to an embedded computer instead of a general-purpose computer to prevent remote connections and improve hardening (e.g., removing unnecessary applications and services that can introduce security risks). In some examples, the retrieval of data can be restricted to methods enforcing physical presence (e.g., requiring connection of a computer or other means of data retrieval that can be accomplished through a direct connection to the data logger(s)).

While an example manner of implementing the data logger apparatus of FIGS. 1-2 is illustrated in FIG. 3, one or more of the elements, processes and/or devices illustrated in FIG. 3 may be combined, divided, re-arranged, omitted, eliminated and/or implemented in any other way. Further, the example data storage 302, the example configurator 304, the example timer 306, the example event detector 308, the example data parser 310, the example identifier 312, the example connector 314, and/or, more generically, the example data logger 300 may be implemented by hardware, software, firmware and/or any combination of hardware, software and/or firmware. Thus, for example, any of the example data storage 302, the example configurator 304, the example timer 306, the example event detector 308, the example data parser 310, the example identifier 312, the example connector 314, and/or, more generically, the example data logger 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data storage 302, the example configurator 304, the example timer 306, the example event detector 308, the example data parser 310, the example identifier 312, and/or the example connector 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data logger 300 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
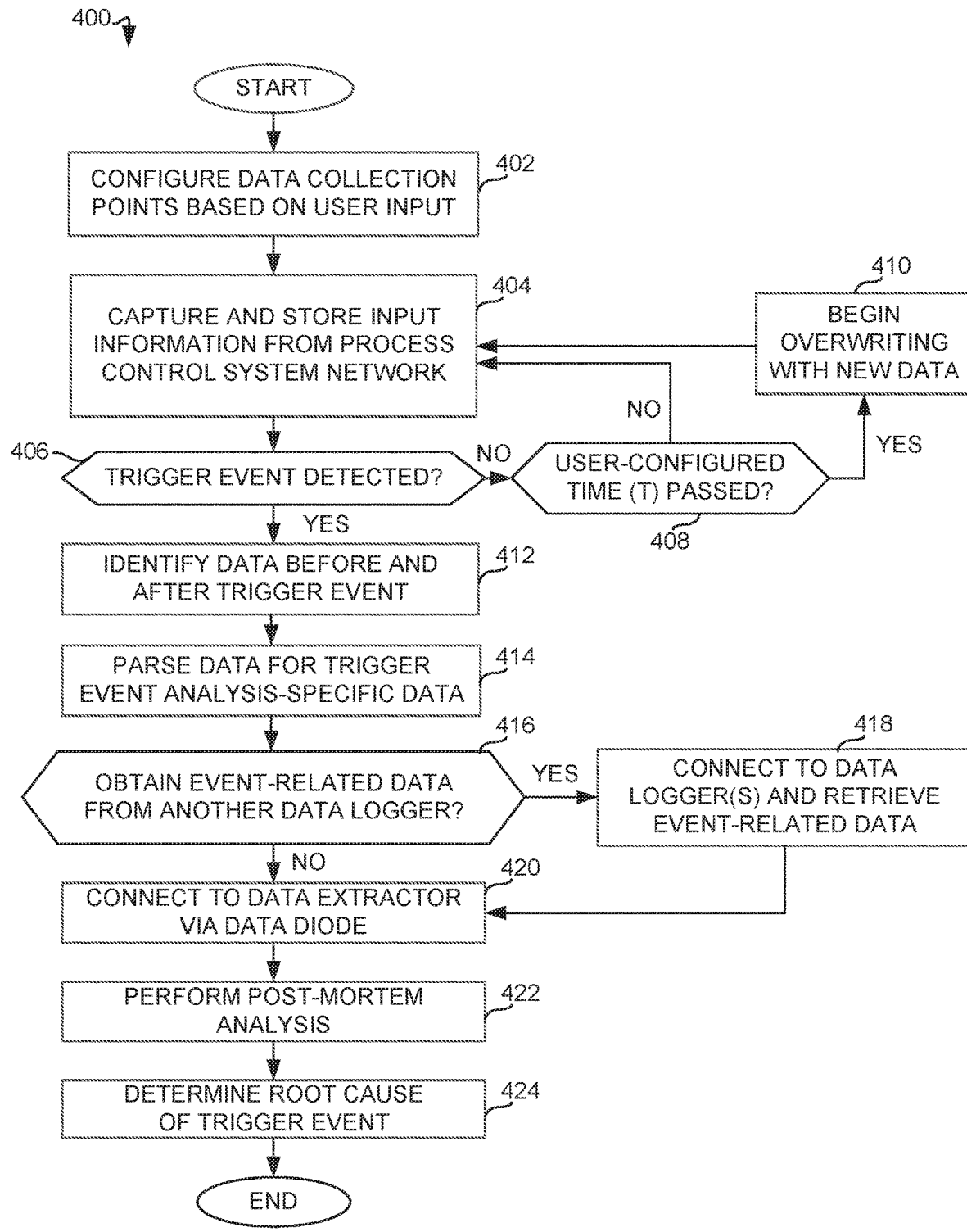
FIG. 4 is a flowchart representative of machine-readable instructions which may be executed to implement the example data logger of FIG. 3.

A flowchart representative of example machine readable instructions for implementing the data logger 300 of FIG. 3 is shown in FIG. 4. The machine-readable instructions may be one or more executable programs or portion(s) of an executable program for execution by a processor such as the processor 506 shown in the example processor platform 500 discussed below in connection with FIG. 5. The program may be embodied in software stored on a non-transitory computer readable storage medium such as a CD-ROM, a floppy disk, a hard drive, a digital versatile disk (DVD), a Blu-ray disk, or a memory associated with the processor 506, but the entire program and/or parts thereof could alternatively be executed by a device other than the processor 506 and/or embodied in firmware or dedicated hardware. Further, although the example program is described with reference to the flowcharts illustrated in FIG. 4, many other methods of implementing the example data logger 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is a flowchart 400 representative of machine-readable instructions which may be executed to implement the example data logger 300 of FIG. 3. The configurator 304 configures data collection points for the data logger based on user input. For example, a user can indicate the time interval over which data collection (e.g., data saved in the data storage 302 of the data logger 300) should occur before data is overwritten in the data storage 302 (block 402). Once the data logger 300 connects to the process control system network (e.g., the SIS 240 and/or the BPCS 250) via the data diode (e.g., data diode(s) 112*b* and/or 131*b*), the data storage 302 stores input information from the local safety network 120 and/or the area control network 132 to the process controller(s) 106 and/or 108 (block 404). The event detector 308 monitors the process control system network information to determine if a trigger event is detected (block 406). For example, the trigger event can include a safety-related event on the SIS 240 network such as a trip event (e.g., unexpected shutdown of the SIS 240). In other examples, the trigger event can be any event defined by a user to be interpreted as a trigger event (e.g., changes in process control system parameters, unexpected changes in network traffic, etc.). If a trigger event is not detected, a timer 306 determines whether a given time interval (T) (e.g., user-configured time interval) has passed (block 408). If the time interval has not yet passed and no trigger event has been detected, the data logger 300 continues to capture and store data from the process control system (block 404). If the time interval has passed, the data storage 302 begins to overwrite existing data with new data (block 410).

If the event detector 308 detects a trigger event at block 406, the data parser 310 identifies data before and after the trigger event using the data storage 302 (block 412). For example, if the trigger event is a safety-related event such as a trip event, the assessment of the event for purposes of identifying its potential cause can require use of data captured before and after the trigger event. In some examples, the data parser 310 parses the data for trigger event analysis-specific data (block 414). Such data can include logged data, metadata, and time stamp information. In some examples, the configurator 304 is used to determine the type of data that is of interest (e.g., required input for an application to perform a thorough assessment of the trigger event). In some examples, the data logger 300 obtains event-related data from one or more other data logger(s) that capture information from the process control system (block 416). For example, the data logger 300 can include several connector (s) 314 that allow for the transfer of information not only to a data extractor 116 and/or 117 or an external network 212, but also to another data logger. As such, if a user-configuration calls for retrieval of data from throughout the process control system (e.g., not limited to the SIS 240 and/or the BPCS 250), the connector 314 can be used to retrieve event-related data to supplement the data available from the process control system being monitored (block 418). If the information is collected via a data extractor(s) 116 and/or 117, the connector 314 connects to the data extractor(s) 116 and/or 117 (block 420). The data diode 112*b* and/or 131*b* enables uni-directional transfer of data from the process control system network to the data logger 300, such that this data can be retrieved using the data extractor 116. In some examples, the data logger 300 has more than one port for transferring information (e.g., one port for transferring information to another data logger, another port for transferring information to a data extractor) via the connector(s) 314. The captured data is then used to perform post-mortem analysis (block 422) to determine, for example, the root cause of a trip event or other trigger event (block 424). In order to increase security by limiting the type and quantity of data that is transferred, for example, to the data extractor 116, the identifier 312 identifies data that is necessary for a post-mortem analysis (e.g., signal value information, data integrity information, and time stamp information captured by the process controller 106 and/or 108). The connector 314 transfers only this data to the data extractor 116, or any type of data that is, for example, included in the configuration of the data logger(s) 112*a* and/or 131*a* using the configurator 304.

Figure 5:
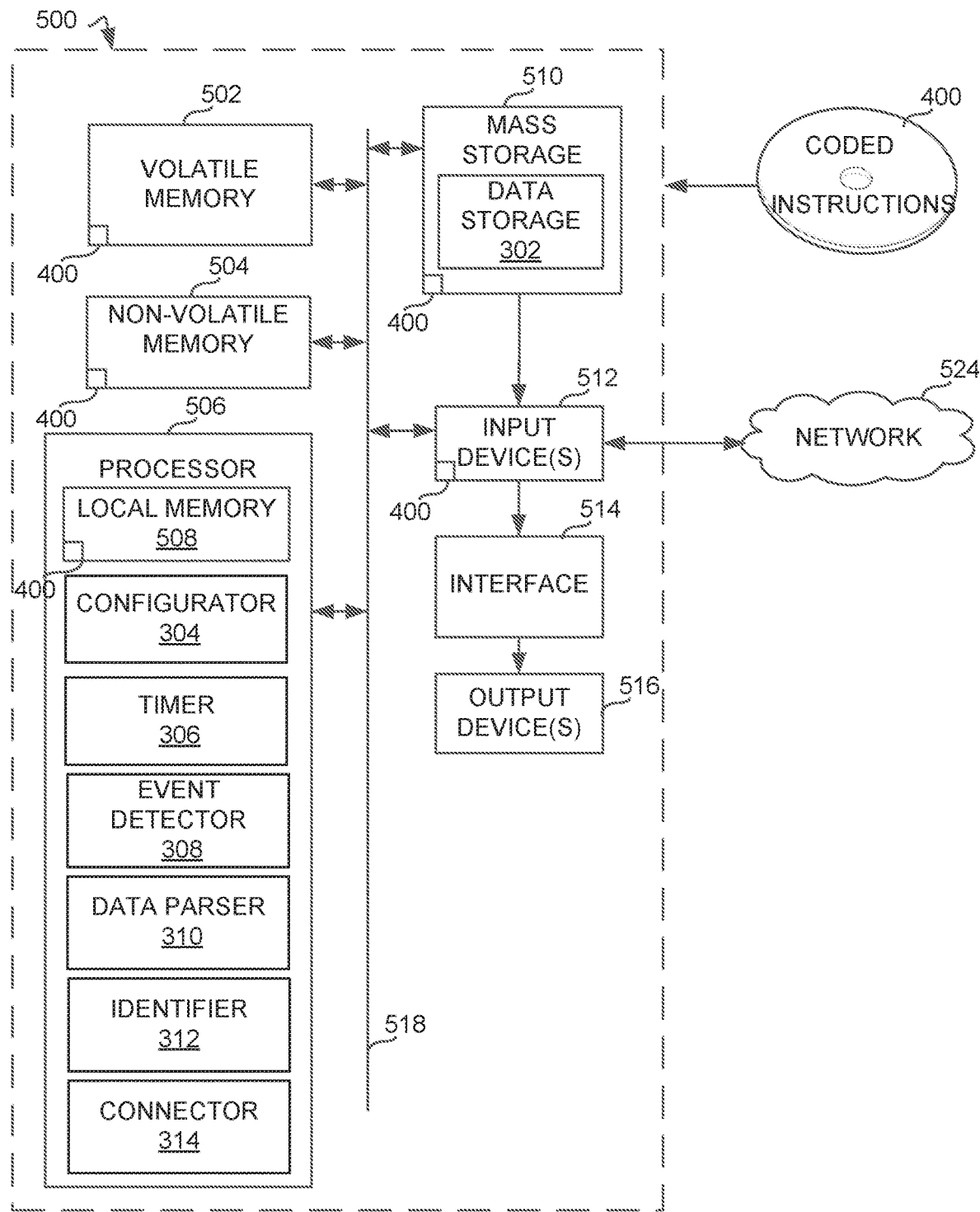
FIG. 5 is a schematic illustration of an example processor platform that may be used and/or programmed to carry out the example methods of FIG. 4 and/or, more generally, to implement the example secure data logger of FIGS. 1, 2, and 3.

FIG. 5 is a block diagram of an example processor platform that may be used and/or programmed to carry out the example method of FIG. 4 and/or, more generally, to implement the example secure data loggers of FIGS. 1-3.

The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 506. The processor 506 of the illustrated example is hardware. For example, the processor 506 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 506 implements the configurator 304, the timer 306, the event detector 308, the data parser 310, the identifier 312, and the connector 314 of the data logger(s) 112a and/or 131a.

The processor 506 of the illustrated example includes a local memory 508 (e.g., a cache). The processor 506 of the illustrated example is in communication with a main memory including a volatile memory 502 and a non-volatile memory 504 via a bus 518. The volatile memory 502 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 504 may be implemented by flash memory and/or any other desired type of memory device. Access to the main memory 502 and 504 is controlled by a memory controller.

The processor platform 500 of the illustrated example also includes an interface circuit 514. The interface circuit 514 may be implemented by any type of interface standard, such as an Ethernet interface, a universal serial bus (USB), a Bluetooth® interface, a near field communication (NFC) interface, and/or a PCI express interface.

In the illustrated example, one or more input devices 512 are connected to the interface circuit 514. The input device(s) 512 permit(s) a user to enter data and commands into the processor 506. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 516 are also connected to the interface circuit 514 of the illustrated example. The output devices 516 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 514 of the illustrated example, thus, typically includes a graphics driver card, a graphics driver chip or a graphics driver processor.

The interface circuit 514 of the illustrated example also includes a communication device such as a transmitter, a receiver, a transceiver, a modem, a residential gateway, a wireless access point, and/or network interface to facilitate exchange of data with external machines (e.g., computing devices of any kind) via a network 524. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 510 for storing software and/or data. Examples of such mass storage devices 510 include floppy disk drives, hard drive disks, compact disk drives, Blu-ray disk drives, redundant array of independent disks (RAID) systems, and digital versatile disk (DVD) drives. The mass storage includes the example data storage 302.

The machine executable instructions 400 of FIG. 4 may be stored in the mass storage device 510, in the volatile memory 502, in the non-volatile memory 504, and/or on a removable non-transitory computer readable storage medium such as a CD or DVD.

Although certain example methods, apparatus and system have been disclosed herein, the scope of coverage of this patent is not limited thereto. On the contrary, this patent covers all methods, apparatus and articles of manufacture fairly falling within the scope of the claims of this patent.

What is claimed is:

1. A method for secure data transfer from a process control system network, comprising:
storing information received by a process controller via the process control system network, the process controller including a safety instrumented system controller or a process control system controller, the information transferred uni-directionally from the process control system network to a data logger via a data diode;
identifying a trigger event on the process control system network;
in response to identifying the trigger event, parsing stored information for event data, the stored information obtained from the data logger; and
transferring the event data from the data logger to a data extractor.

2. The method of claim 1, wherein parsing the stored information includes retrieving data before and after the trigger event.

3. The method of claim 1, wherein transferring the event data includes transferring only one or more of signal value information, data integrity information, and time stamp information captured by the process controller if the trigger event is a safety-related event.

4. The method of claim 1, wherein the process control system network includes a local safety network or an area control network.

5. The method of claim 4, wherein parsing the stored information includes parsing the event data for at least one of the local safety network or the area control network.

6. The method of claim 1, wherein the event data includes logged data, metadata, and time stamp information.

7. The method of claim 1, wherein the trigger event is a safety-related event, the safety-related event including appearance of an unexpected node on the network or a change in a traffic pattern of the network, the change corresponding to a deviation from a traffic pattern designated as normal.

8. The method of claim 1, further including configuring the event data based on user input, the user input including a data collection time interval of interest.

9. The method of claim 8, further including determining when a user-configured time interval has elapsed and overwriting the stored information when the time interval has elapsed.

10. The method of claim 1, further including initiating an alarm outside of the process control system network, the alarm used when input information to the process controller is not accessible.

11. An apparatus for secure data transfer from a process control system network, comprising:
- a data storage to store information received by a process controller via the process control system network, the process controller including a safety instrumented system controller or a process control system controller, the information transferred uni-directionally from the process control system network to a data logger via a data diode;
- an event detector to identify a trigger event on the process control system network;
- a data parser to parse stored information for event data in response to identifying the trigger event, the stored information obtained from the data logger; and
- a connector to transfer the event data from the data logger to a data extractor.

12. The apparatus of claim 11, wherein the data parser is to retrieve data before and after the trigger event when the trigger event is a safety-related event.

13. The apparatus of claim 12, wherein the connector is to transfer the event data, including one or more of signal value information, data integrity information, and time stamp information captured by the process controller.

14. The apparatus of claim 11, wherein the data parser is to parse the event data for at least one of a local safety network or an area control network.

15. The apparatus of claim 11, further including a configurator to configure the event data based on user input, the user input including a data collection time interval of interest.

16. The apparatus of claim 15, further including a timer to determine when a user-configured time interval has elapsed and the stored information overwritten when the time interval has elapsed.

17. A non-transitory computer readable storage medium comprising instructions that, when executed, cause a machine to at least:
- store information received by a process controller via a process control system network, the process controller including a safety instrumented system controller or a process control system controller, the information transferred uni-directionally from the process control system network to a data logger via a data diode;
- identify a trigger event on a process control system network;
- parse stored information for event data in response to identifying the trigger event, the stored information obtained from the data logger; and
- transfer the event data from a data logger to a data extractor.

18. The computer readable storage medium of claim 17, wherein the instructions, when executed, further cause the machine to transfer one or more of signal value information, data integrity information, and time stamp information captured by the process controller.

19. The computer readable storage medium of claim 17, wherein the instructions, when executed, further cause the machine to parse the event data for at least one of a local safety network or an area control network.

20. The computer readable storage medium of claim 17, wherein the instructions, when executed, further cause the machine to determine when a user-configured time interval has elapsed, the stored information overwritten when the time interval has elapsed.

* * * * *